(12) United States Patent
Gustafson et al.

(10) Patent No.: US 7,644,406 B2
(45) Date of Patent: Jan. 5, 2010

(54) UPDATE SYSTEM CAPABLE OF UPDATING SOFTWARE ACROSS MULTIPLE FLASH CHIPS

(75) Inventors: James P. Gustafson, Irvine, CA (US); Toni Pakarinen, Ladera Ranch, CA (US); Karl W. Hammerberg, Olathe, KS (US); Bindu Rama Rao, Laguna Niguel, CA (US); Rafe V. Campbell, Dana Point, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1070 days.

(21) Appl. No.: 10/761,735

(22) Filed: Jan. 20, 2004

(65) Prior Publication Data

US 2004/0243992 A1  Dec. 2, 2004

Related U.S. Application Data

(60) Provisional application No. 60/441,895, filed on Jan. 21, 2003.

(51) Int. Cl.
*G06F 9/44* (2006.01)
*G06F 15/16* (2006.01)

(52) U.S. Cl. .................. 717/172; 717/173; 709/202
(58) Field of Classification Search .................. None
See application file for complete search history.

(56) References Cited

U.S. PATENT DOCUMENTS

| | | | |
|---|---|---|---|
| 5,261,055 A | 11/1993 | Moran et al. | 395/275 |
| 5,442,771 A | 8/1995 | Filepp et al. | 395/650 |
| 5,471,592 A * | 11/1995 | Gove et al. | 709/213 |
| 5,479,637 A | 12/1995 | Lisimaque et al. | 395/430 |
| 5,579,522 A | 11/1996 | Christeson et al. | 395/652 |
| 5,596,738 A | 1/1997 | Pope | 395/430 |
| 5,598,534 A | 1/1997 | Haas | 395/200.09 |
| 5,608,910 A | 3/1997 | Shimakura | 395/670 |
| 5,623,604 A | 4/1997 | Russell et al. | 395/200.1 |
| 5,666,293 A | 9/1997 | Metz et al. | 395/200.5 |
| 5,752,039 A | 5/1998 | Tanimura | 395/712 |
| 5,778,440 A | 7/1998 | Yiu et al. | 711/154 |
| 5,790,974 A | 8/1998 | Tognazzini | 701/204 |
| 5,878,256 A | 3/1999 | Bealkowski et al. | 395/652 |
| 5,960,445 A | 9/1999 | Tamori et al. | 707/203 |
| 6,009,497 A | 12/1999 | Wells et al. | 711/103 |

(Continued)

FOREIGN PATENT DOCUMENTS

CA   2339923   3/2000

(Continued)

*Primary Examiner*—Tuan Q Dam
*Assistant Examiner*—Zheng Wei

(57) ABSTRACT

Disclosed herein is a mobile services network including an electronic device with an update agent that may be capable of updating firmware and application software stored in non-volatile memory and employing multiple FLASH memory chips. The update agent may employ an update package generated to update firmware/software data segments and code segments. In an embodiment according to the present invention, the update agent may also employ a flash library supporting multiple FLASH memory chips from the same or different manufacturers. In an embodiment according to the present invention, the FLASH memory chips may be grouped. The update agent may also be capable of updating code in the multiple FLASH memory chips in the non-volatile memory of the electronic device.

52 Claims, 8 Drawing Sheets

U.S. PATENT DOCUMENTS

| | | | |
|---|---|---|---|
| 6,038,636 A | 3/2000 | Brown, III et al. | 711/103 |
| 6,064,814 A | 5/2000 | Capriles et al. | 395/701 |
| 6,073,206 A | 6/2000 | Piwonka et al. | 711/102 |
| 6,073,214 A | 6/2000 | Fawcett | 711/133 |
| 6,088,759 A | 7/2000 | Hasbun et al. | 711/103 |
| 6,105,063 A | 8/2000 | Hayes, Jr. | 709/223 |
| 6,112,024 A | 8/2000 | Almond et al. | 395/703 |
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,148,441 A * | 11/2000 | Woodward | 717/168 |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,279,153 B1 | 8/2001 | Bi et al. | 717/11 |
| 6,311,322 B1 | 10/2001 | Ikeda et al. | 717/1 |
| 6,438,585 B2 | 8/2002 | Mousseau et al. | 709/206 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0078209 A1 | 6/2002 | Peng | 709/227 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |
| 2003/0084434 A1 | 5/2003 | Ren | |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |
| WO | WO 02/41147 A1 * | 5/2002 |

* cited by examiner

UPDATE SYSTEM CAPABLE OF UPDATING SOFTWARE ACROSS MULTIPLE FLASH CHIPS

CROSS-REFERENCE TO OTHER APPLICATIONS

The present application claims the benefit of priority of U.S. Provisional Patent Application having Ser. No. 60/441,895, filed on Jan. 21, 2003, and hereby incorporates herein by reference the complete subject matter thereof in its entirety.

The present application also hereby incorporates herein by reference the complete subject matter of PCT Application having publication number WO 02/41147 A1, and having application number PCT/US01/44034, filed on Nov. 19, 2001, in its entirety.

The present application also hereby incorporates herein by reference the complete subject matter of U.S. Provisional Patent Application having Ser. No. 60/249,606, filed Nov. 17, 2000 in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices (i.e., mobile electronic devices having software/firmware), for example, mobile cellular phones, personal digital assistants (PDA's), pagers, MP3 players, digital cameras, etc. often contain firmware and/or application software that are either provided by the manufacturers of the electronic devices, telecommunication carriers, or third parties. These firmware and application software often contain bugs. New versions (updates) of the firmware and software are periodically released to fix the bugs, introduce new features, or both.

Update programs, code, or functions employed to update the firmware or firmware components may need to be changed or updated. However, the upgraded programs, code or functions may not fit into the space originally available in the electronic device (FLASH memory or another type of memory or storage). Changes to firmware or firmware components may need to be performed in a fault tolerant mode, but fault tolerant code may be difficult to implement.

Electronic devices may employ non-volatile memory, such as FLASH memory chips, to store code and data. Sometimes, more than one memory device may be employed. Updating code or data distributed across multiple memory devices may be difficult, especially if the chips are made by different manufacturers. For example, it is often the case where the architecture of a supplier's FLASH memory chip may not be known. Writing across multiple FLASH memory chips grouped in a distributed fashion may require knowledge of the architecture of the individual FLASH memory chips. Some components in electronic devices may have an embedded FLASH memory segment, which may not be accessible from an external system.

Further limitations and disadvantages of conventional and traditional approaches will become apparent to one of skill in the art, through comparison of such systems with some aspects of the present invention as set forth in the remainder of the present application with reference to the drawings appended hereto.

SUMMARY OF THE INVENTION

Aspects of the present invention may be found in a method of updating non-volatile memory in an electronic device via a communication network. The non-volatile memory may comprise at least one memory device having an associated type. The method may comprise receiving update information via the communication network, selecting one of the at least one memory device to be updated using the update information, identifying updating software corresponding to at least the associated type of the one of the at least one memory device to be updated, and updating the one of the at least one memory device using the identified updating software and the update information.

In an embodiment according to the present invention, the method may further comprise determining the associated type of the one of the at least one memory device to be updated.

In an embodiment according to the present invention, the communication network is a wireless network.

In an embodiment according to the present invention, the communication network is a public network.

In an embodiment according to the present invention, the method may further comprise verifying the updating of the one of the at least one memory device using one of a CRC, a checksum value, a hash code, and a digital signature.

Aspects of the present invention may be found in a method of updating non-volatile memory in an electronic device via a communication network. The non-volatile memory may comprise at least one memory device having an associated type. The method may comprise communicating update information in an update package via the communication network from a management server to the electronic device, and employing the update agent to interact with a memory library and the at least one memory device in non-volatile memory in the electronic device.

In an embodiment according to the present invention, the method may further comprise employing a memory manager to access contents stored in the at least one memory device. The at least one memory device may comprises at least one FLASH memory chip. The method may also comprise employing the memory library to modify contents of the at least one FLASH memory chip.

In an embodiment according to the present invention, the at least one FLASH memory chip may further comprise a plurality of FLASH memory chips. The plurality of FLASH memory chips may be fabricated by one of a same manufacturer and different manufacturers. The plurality of FLASH memory chips may comprise one of a same amount of memory size and a different amount of memory size.

In an embodiment according to the present invention, the method may further comprise determining which of the plurality of FLASH memory chips correspond to a particular FLASH memory modification, employing an appropriate FLASH memory chip function, and performing a corresponding FLASH memory modification.

In an embodiment according to the present invention, the method may further comprise employing the memory library by the update agent to permit access to and manipulation of a plurality of FLASH memory chips fabricated by different manufacturers, and invoking appropriate functions stored in the memory library corresponding to the different manufacturers FLASH memory chips.

In an embodiment according to the present invention, the method may further comprise storing generic functions in the memory library which are employable by the update agent and modifying contents of the at least one memory device without identifying actual details regarding a specific memory device. The actual details may be selected from a group comprising memory device manufacturer, memory device type, memory size, memory model, and memory brand.

In an embodiment according to the present invention, the at least one memory device may further comprise a plurality of memory devices. The plurality of memory devices may be adapted to be grouped together, paired together, or arranged serially in non-volatile memory in the electronic device.

In an embodiment according to the present invention, the method may further comprise creating a memory map of memory device architecture. The memory map may contain information selected from a group comprising of a number of memory devices being employed by the electronic device, address ranges assigned to the memory devices, memory device operating mode, a map of data segments resident in the memory devices, and a map of code segments resident in the memory devices.

In an embodiment according to the present invention, the electronic device may comprise one of a mobile cellular phone handset, a personal digital assistant, a pager, an MP3 player, and a digital camera.

In an embodiment according to the present invention, the method may further comprise employing an update package status and reference section by the update agent code to retrieve information regarding functions stored in a memory library code.

In an embodiment according to the present invention, the update package status and reference section may further comprise at least one of a status flag, starting address, authentication value, location of update package, and locations of a plurality of modification functions in non-volatile memory of the electronic device.

In an embodiment according to the present invention, the update package may comprise update information for at least one of firmware and software, version upgrades, instructions to add new services, and instructions to delete services employable in the electronic device.

In an embodiment according to the present invention, the method may further comprise employing a boot initialization code to determine whether an update agent code is executed.

In an embodiment according to the present invention, determining whether the update agent code is executed may comprise evaluating status information resident in an update package status and reference section. If it is determined that the update agent code is to be executed, then the update agent code accesses an update package resident in the non-volatile memory of the electronic device by employing an address of the update package stored in the update package status and reference section.

In an embodiment according to the present invention, the at least one memory device may comprise a plurality of memory devices. The update agent may be adapted to interact with the plurality of memory devices as a single logical block of non-volatile memory without distinguishing between specific memory devices.

In an embodiment according to the present invention, the plurality of memory devices may be arranged according to one of contiguously or non-contiguously in memory. Code and data resident in the memory devices may be updateable by the update agent regardless of which memory device the code and data reside in.

In an embodiment according to the present invention, the memory library may be adapted to accommodate a plurality of different types of memory devices by being provided with drivers for the plurality of different types of memory devices during manufacture.

In an embodiment according to the present invention, the update agent may be adapted to accommodate a plurality of different types of memory devices by accessing the memory library and compiling the update agent anew with drivers for the plurality of different types of memory devices stored in the memory library during manufacture.

In an embodiment according to the present invention, the electronic device comprises at least one processor. The at least one processor may be associated with a specific memory device.

In an embodiment according to the present invention, the at least one processor may comprise a plurality of processors. The at least one memory device may comprise a plurality of memory devices. Each of the processors may be associated with a specific memory device.

In an embodiment according to the present invention, the at least one processor may comprise a plurality of processors. The at least one memory device may comprise a plurality of memory devices. The plurality of processors may be adapted to share the plurality of memory devices.

In an embodiment according to the present invention, the at least one processor may comprise a digital signal processor (DSP) adapted to execute DSP code retrieved from the least one memory device.

Aspects of the present invention may be found in a mobile services network adapted to update at least one electronic device. The network may comprise a management server communicatively connectable to the at least one electronic device via a communication link. The management server may be adapted to transmit update information in an update package to the electronic device. The electronic device may comprise an update agent employing a memory library to interact with at least one memory device in non-volatile memory in the electronic device.

In an embodiment according to the present invention, the network may further comprise a memory manager adapted to be employed by the update agent to access contents stored in the at least one memory device, and a memory library adapted to support modifications of content in the at least one memory device.

In an embodiment according to the present invention, the at least one memory device may further comprise a plurality of memory devices. The plurality of memory devices may be fabricated by one of a same manufacturer and different manufacturers. The plurality of memory devices may also comprise one of a same amount of memory size and a different amount of memory size.

In an embodiment according to the present invention, the update agent may be adapted to determine which of the plurality of memory devices correspond to a particular memory modification and employ an appropriate memory device function available in the memory library to perform a corresponding memory modification.

In an embodiment according to the present invention, the memory library may be employable by the update agent to permit access to and manipulation of a plurality of memory devices fabricated by different manufacturers by invoking appropriate functions stored in the memory library which correspond to the different manufacturers memory devices.

In an embodiment according to the present invention, the memory library may store generic functions employable by the update agent to modify contents of a plurality of memory devices without identifying actual details regarding a specific memory device. The actual details may be selected from a group comprising memory manufacturer, memory type, memory size, memory model, and memory brand.

In an embodiment according to the present invention, the at least one memory device may further comprise a plurality of memory devices. The plurality of memory devices may be adapted to be grouped together, paired together, or arranged serially.

In an embodiment according to the present invention, the network may further comprise a memory map of memory device architecture. The memory map may be adapted to contain information selected from a group comprising a number of memory devices being employed by the electronic device, address ranges assigned to the memory devices, memory device operating mode, a map of data segments resident in the memory devices, and a map of code segments resident in the memory devices.

In an embodiment according to the present invention, the electronic device may comprise one of a mobile cellular phone handset, a personal digital assistant, a pager, an MP3 player, and a digital camera.

In an embodiment according to the present invention, the non-volatile memory may further comprise an update package status and reference section employable by an update agent code to retrieve information regarding functions stored in a memory library code.

In an embodiment according to the present invention, the update package may comprise update information for at least one of firmware and software, version upgrades, instructions to add new services, and instructions to delete services employable in the electronic device.

In an embodiment according to the present invention, the electronic device may be adapted to employ a boot initialization code to determine whether an update agent code is executed. Determining whether the update agent code is executed may comprise evaluation of status information resident in an update package status and reference section. If it is determined that the update agent code is to be executed, then update agent code accesses an update package resident in the non-volatile memory by employing an address of the update package stored in the update package status and reference section.

In an embodiment according to the present invention, the update package status and reference section may further comprise at least one of a status flag, starting address, authentication value, location of update package, and locations of a plurality of modification functions in non-volatile memory of the electronic device.

In an embodiment according to the present invention, the at least one memory device may comprise a plurality of memory devices. The update agent may be adapted to interact with the plurality of memory devices as a single logical block of non-volatile memory with distinguishing between specific memory devices.

In an embodiment according to the present invention, the plurality of memory device may be arranged as one of contiguously or non-contiguously in memory. Code and data resident in the memory devices may be updateable by the update agent regardless of which memory device the code and data reside in.

In an embodiment according to the present invention, the memory library may be adapted to accommodate a plurality of different types of memory devices by being provided with drivers for the plurality of different types of memory devices during manufacture.

In an embodiment according to the present invention, the update agent may be adapted to accommodate a-plurality of different types of memory devices by accessing the memory library and compiling the update agent with drivers for the plurality of different types of memory devices stored in the memory library during manufacture.

In an embodiment according to the present invention, the electronic device may comprise at least one processor. The at least one processor may be associated with a specific memory device.

In an embodiment according to the present invention, the at least one processor may comprise a plurality of processors. The at least one memory device may comprise a plurality of memory devices. Each of the processors may be associated with a specific memory device.

In an embodiment according to the present invention, the at least one processor may comprise a plurality of processors. The at least one memory device may comprise a plurality of memory devices. The plurality of processors may be adapted to share the plurality of memory devices.

In an embodiment according to the present invention, the at least one processor may comprise a digital signal processor (DSP) adapted to execute DSP code retrieved from at least one memory device.

These and various other advantages and features of novelty which characterize the invention are pointed out with particularity in the claims annexed hereto and that form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

DETAILED DESCRIPTION OF THE DIAGRAMS

Figure 1A:
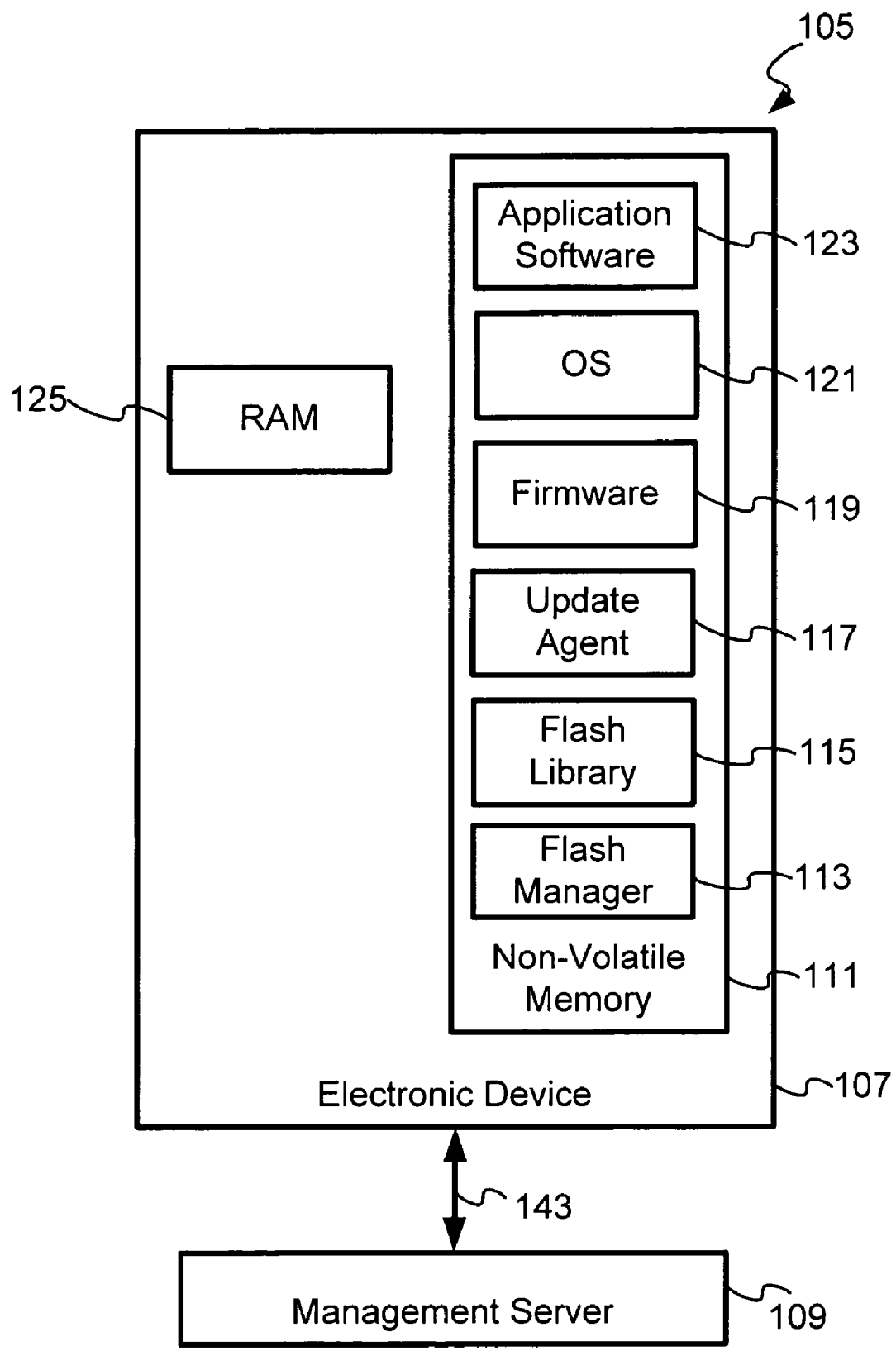
FIG. 1a is a block diagram illustrating an update network for an electronic device according to an embodiment of the present invention.

FIG. 1a is a block diagram illustrating an update network for an electronic device according to an embodiment of the present invention. An electronic device may be for example, a mobile electronic device having software/firmware, such as, mobile cellular phone handsets, personal digital assistants (PDA's), pagers, MP3 players, digital cameras, etc.

FIG. 1a illustrates an update network 105 that may support update of application software 123, operating system (OS) 121, or firmware 119 in an electronic device 107 employing at least one update package which may be provided by management server 109 via communication link 143. Communication link 143 may be a wired or wireless communication link. An update package may comprise firmware/software updates that modify or change the version of a particular firmware/software, for example, upgrading to a newer version. An update package may also add new services to the electronic device or delete services, as desired by the service provider or an end-user.

Electronic device 107 may be capable of applying updates using update agent 117 to process the at least one update package. The electronic device 107 may also comprise non-volatile memory 111, random access memory (RAM) 125, and additional components, such as processors, display, etc. (not shown in FIG. 1a).

Non-volatile memory 111 may comprise an update agent 117 capable of updating the firmware 119, operating system 121, application software 123, etc. Update agent 117 may also employ memory library or flash library 115 to interact with one or more FLASH memory chips (not shown in FIG. 1a) comprising the non-volatile memory 111. In an embodiment according to the present invention, the update agent 117 may employ memory manager or flash manager 113 to access contents stored in non-volatile memory 111.

In an embodiment according to the present invention, memory library or flash library 115 may support reading, writing, erasing, etc., content from a plurality of memory devices, for example FLASH memory chips (not shown in FIG. 1a). The plurality of FLASH memory chips however, may be fabricated by multiple manufacturers. Update agent 117 may also be capable of determining which of a plurality of FLASH memory chips may be employed during a read, write, erase, etc., operation, and employ an appropriate one of a plurality of FLASH memory chip functions available in memory library or flash library 115 to execute a particular operation.

For example, if non-volatile memory 111 comprises AMD™ FLASH memory chips and INTEL™ FLASH memory chips, memory library or flash library 115, which may be employed by update agent 117 to identify, access, and modify, for example read, write, erase, etc., memory devices, for example FLASH memory chips, may also provide functions enabling access to and manipulation of the AMD™ FLASH memory chips and the INTEL™ FLASH memory chips. Update agent 117 may invoke appropriate functions provided by and stored in memory library or flash library 115 to access, read, write, erase, or otherwise modify, the contents of the plurality of different FLASH memory chips incorporated in non-volatile memory 111.

In an embodiment according to the present invention, update agent 117 may invoke generic wrapper functions to read, write, erase, etc., the plurality of FLASH memory chips. Generic wrapper functions, such as for example, flashread( ), flasherase( ), and flashwrite( ), etc., may enable the abstraction of reading, writing, etc., to generic FLASH memory chips while encapsulating actual implementation details of the generic functions in terms of calls to particular FLASH memory chip-specific functions. Thus, when invoking chip-specific functions to read, write, erase, etc., the contents of memory devices, for example FLASH memory chips, the functions may be performed using the generic wrapper functions without the update agent being aware of the specifics of the FLASH memory architecture, i.e., the update agent may be unaware of the brand/manufacturer/type/model, etc. of particular individual FLASH memory chips.

FLASH memory chip architecture in non-volatile memory 111 may be grouped (i.e., may incorporate a plurality of FLASH memory chips), or serially (i.e., incorporating a single FLASH memory chip). The memory map of the FLASH memory chip architecture may specify the number of FLASH memory chips employed in the electronic device and the address ranges assigned to the FLASH memory chips. For grouped operation of memory devices, for example FLASH memory chips, the FLASH operation may be in one of word mode or byte mode, as necessary or desirable. For serial mode operation of FLASH memory chips, user data segments and code segments may need to be specified.

Figure 1B:
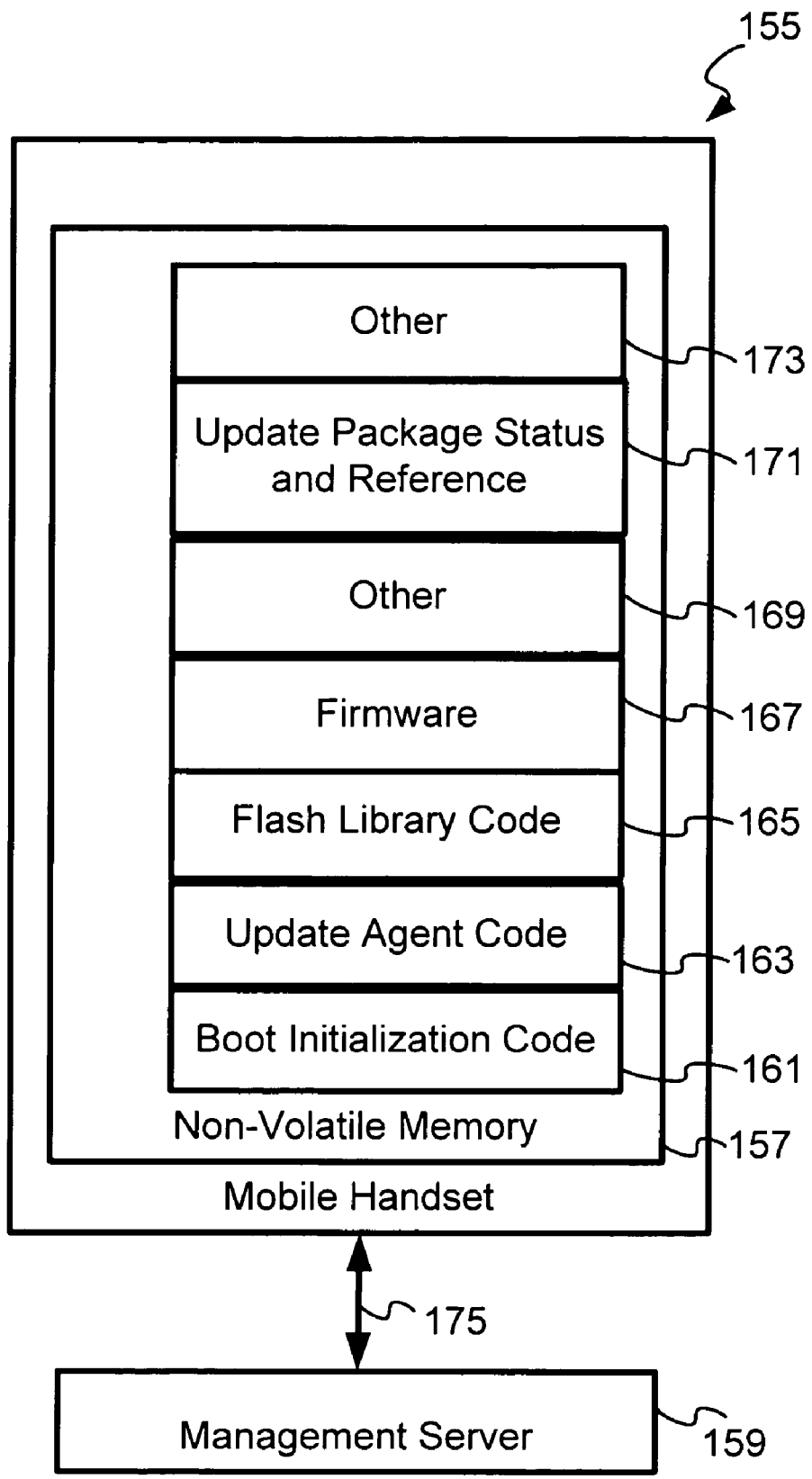
FIG. 1b is a block diagram illustrating an electronic device comprising non-volatile memory according to an embodiment of the present invention.

FIG. 1b is a block diagram illustrating an electronic device comprising non-volatile memory according to an embodiment of the present invention. An electronic device may be for example, a mobile electronic device having software/firmware, such as, mobile cellular phone handsets, personal digital assistants (PDA's), pagers, MP3 players, digital cameras, etc.

FIG. 1b illustrates an update network that may support update of an electronic device, for example mobile handset 155, employing at least one update package which may be provided by a management server 159 via communication link 175. The electronic device, for example mobile handset 155, may comprise non-volatile memory 157. Non-volatile memory 157 may in turn comprise an update package status and reference section 171 which may be employed by update agent code 163 to retrieve information regarding functions provided by memory library code or flash library code 165. An update package may comprise firmware/software updates adapted to modify or change the version of a particular firmware/software, for example upgrading to a newer version. An update package may also add new services to the electronic device or delete services, as desired by the service provider or an end-user.

On power up or reboot, the electronic device, for example mobile handset 155, may execute a boot initialization code 161, which in turn may determine whether the update agent code 163 should be executed. The determination to execute the update agent code 163 may be based upon status information provided by the update package status and reference section 171. If it is determined that the update agent code 163 be executed, then control may be passed to the update agent code 163 that accesses an update package resident in non-volatile memory 157 employing an address of the update package saved in the update package status and reference section 171.

When update agent code 163 needs to access functions provided by a memory library or flash library, the update agent code 163 may require an address to the appropriate functions. The address to the functions may be available in the update package status and reference section 171. The address may have been populated by the manufacturer of the electronic device with the appropriate address values during manufacture and/or initial programming.

The address of functions related to reading, writing, erasing, etc. of FLASH memory chips provided in memory library code or flash library code 165 may be provided in update package status and reference section 171 and may be accessed by update agent code 163 to invoke the functions. Non-volatile memory 157 may also comprise firmware section 167 and other memory sections 169 and 173 that may be employed as temporary buffers for storing location and identification information regarding the electronic device, end-user related information, most current software/firmware version information, update scheduling information, etc.

Figure 1C:
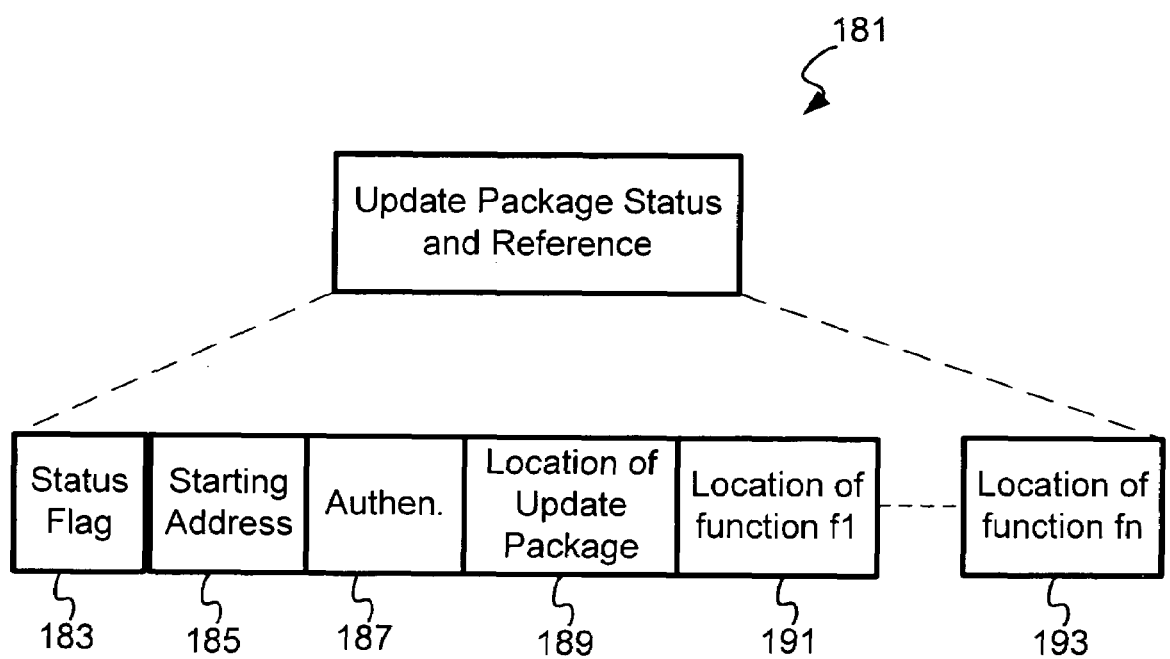
FIG. 1c is a block diagram illustrating exemplary contents of an update package status and reference section in the non-volatile memory of an electronic device according to an embodiment of the present invention.

FIG. 1c is a block diagram illustrating exemplary contents of update package status and reference section 181 in non-volatile memory of an electronic device according to an embodiment of the present invention. The update package status and reference section 181 illustrated in FIG. 1c may correspond to the update package status and reference section 171 illustrated in FIG. 1b. In FIG. 1c, the update package status and reference section 181 may at least comprise status flag 183, starting address 185 of firmware/software, authentication value 187 (for example, a CRC value, checksum value, hash code, or a digital signature), the location of update package 189, and the location of a plurality of functions (f1 .. fn, 191 . . . 193). The contents of the update package status and reference section 181 may also be used to access the memory devices, for example FLASH memory chips constituting non-volatile memory of the electronic device.

In an embodiment according to the present invention, status flag 183 may indicate the need to update firmware/software in the electronic device. The update agent code accessing the functions may be provided with the location of the functions provided by the memory library or flash library. Thus, for example, when the update package accesses the location of, for example, function fn 193, provided by the update package status and reference section 181, the update package may invoke the associated function fn provided by the memory library or flash library.

Figure 2:
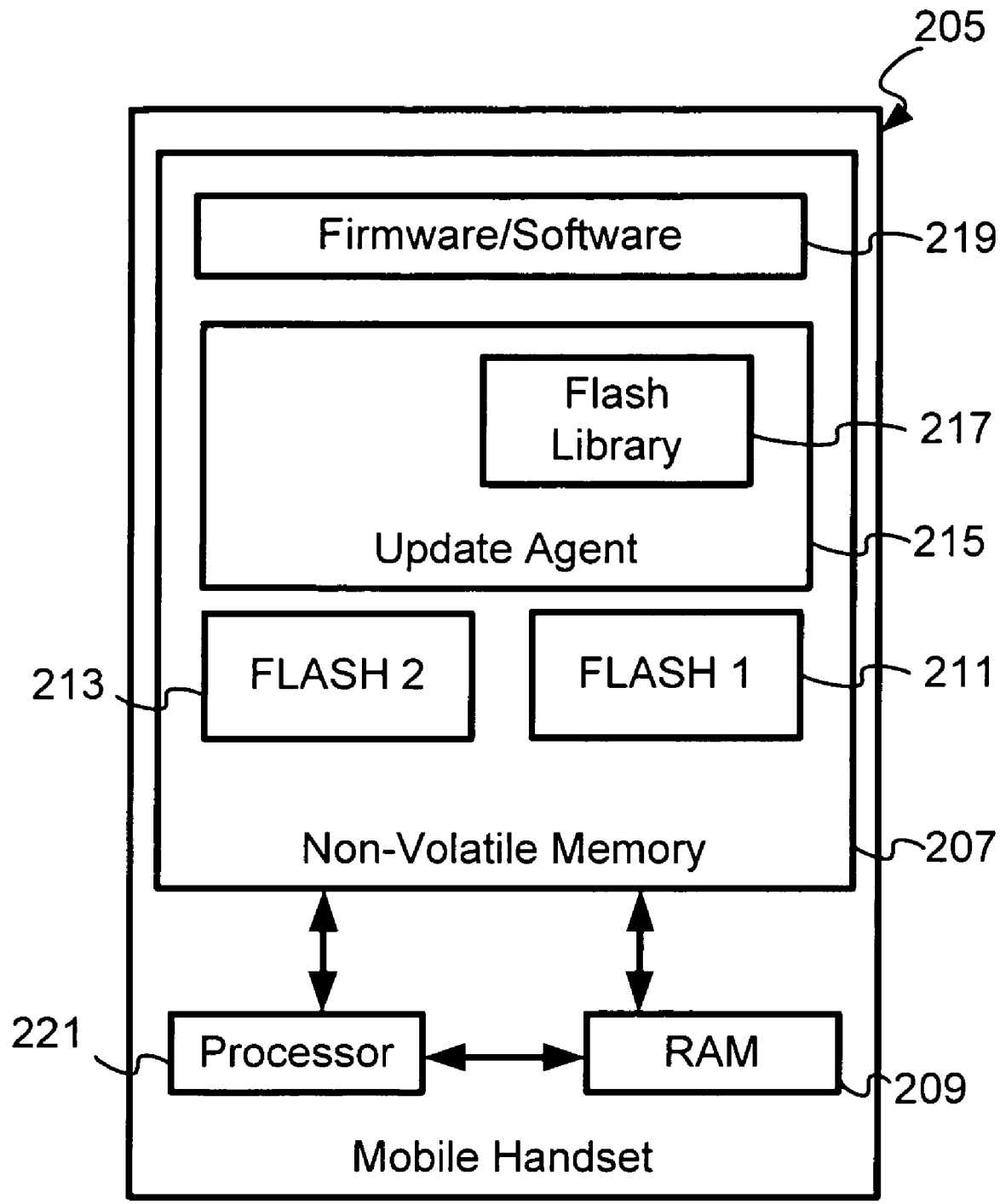
FIG. 2 is a block diagram illustrating an electronic device employing multiple FLASH memory chips in non-volatile memory according to an embodiment of the present invention.

FIG. 2 is a block diagram illustrating an electronic device employing multiple memory devices, for example FLASH memory chips in non-volatile memory according to an embodiment of the present invention. FIG. 2 illustrates an electronic device, for example mobile handset 205, employing multiple memory devices, for example FLASH memory chips in non-volatile memory 207. The electronic device may also employ update agent 217 capable of updating code or data resident in any of the multiple FLASH memory chips. For convenience and clarity, only one processor and two memory devices, for example FLASH memory chips, have been illustrated in FIG. 2, however numerous processors and FLASH memory chips may be grouped in accordance with the present invention.

The electronic device, for example mobile handset 205, may comprise processor 221, RAM 209, and non-volatile memory 207. The firmware/software 219 may be resident in non-volatile memory, in addition to update agent 215. The non-volatile memory 207 may be composed of a plurality of memory devices, for example FLASH memory chips, for example two FLASH memory chips, as shown in FIG. 2. Update agent 215 may employ memory library or flash library 217 to provide manipulation of the contents of a plurality of FLASH memory chips. Memory library or flash library 217 may also comprise functions permitting manipulation of a plurality of memory devices, for example FLASH memory chips, for example FLASH 1 211 and FLASH 2 213.

In an embodiment according to the present invention, non-volatile FLASH memory chips, for example FLASH 1 211 and FLASH 2 213 may be incorporated into a memory map such that the address locations supported by the FLASH memory chips are contiguous, i.e., arranged adjacently. Update agent 215 may consider the combination of a plurality of FLASH memory chips, for example the pair of FLASH memory chips FLASH 1 211 and FLASH 2 213, as part of a single logical block of non-volatile memory 207 without needing to distinguish between the FLASH memory chips when arranged contiguously. Any code resident in non-volatile memory may be updated regardless of which of the plurality of FLASH memory chips the code resides in.

In an embodiment according to the present invention, a plurality of non-volatile memory devices, for example FLASH memory chips, such as FLASH 1 211 and FLASH 2 213 may be incorporated into a memory map of the non-volatile memory such that the address locations supported by the FLASH memory chips are not contiguous, i.e., separated by a gap in memory addresses. However, update agent 215 may be capable of updating code spread across a plurality of non-volatile FLASH memory chips, for example FLASH memory chips, FLASH 1 211 and FLASH 2 213, which are not contiguously arranged.

In an embodiment according to the present invention, the update agent may invoke appropriate memory library or flash library functions based upon the actual memory device, for example FLASH memory chip, being employed in the electronic device, and as determined by a function called detect( ) which may be invoked during a read, write, erase, etc. operation and may be adapted to detect the brand/manufacturer/type/model of FLASH memory chip being employed in the electronic device. For example, if a FLASH memory chip(s) 16 MB in size is used in the electronic device and if the FLASH memory chip(s) comprising the 16 MB of memory are manufactured by, for example INTEL® and/or AMD®, then a writeToFlash( ) library function adapted to write to the FLASH memory chips, may be coded as shown in the following pseudo code below.

```
writeToFlash(destAddr, sourceAddr, size)
{
    long addr;
    String part;
    if (addr < 16 MB) // make sure the address range is appropriate
    {
        part = detect( ); // detect the actual FLASH chip
        if (part=='INTEL')
        {
            writeToIntel(sourceAddr, size);
            ...
        }
        else if (part == 'AMD')
        {
            writeToAmd(sourceAddr, size);
            ...
        }
    }
}
```

In an embodiment according to the present invention, the update agent may also invoke appropriate memory library or flash library functions based upon the code segments (or address ranges) being invoked for read, write, erase, etc. operations. For example, if FLASH 1 is 16 MB in size and FLASH 2 is 32 MB in size, and FLASH 1 and FLASH 2 are contiguous, then a writeToFlash( ) library function adapted to write to memory devices, for example FLASH memory chips, may be coded as shown in the following pseudo code below.

```
writeToFlash(destAddr, sourceAddr, size)
{
```

-continued

```
        long addr;
        String part;
        if (destAddr < 16 MB)
        {
            // 'INTEL' FLASH chip
                writeToIntel(sourceAddr, size);
            ...
        }
        else // 'AMD' FLASH chip
        {
                writeToAmd(sourceAddr, size);
            ...
        }
    }
```

In an embodiment according to the present invention, a plurality of non-volatile memory devices, for example FLASH memory chips, such as FLASH 1 211 and FLASH 2 213, may be grouped together or paired together. The contents of any file or code may be spread across all of the memory devices, for example FLASH memory chips resident in the electronic device, for example across both of FLASH memory chips FLASH 1 211 and FLASH 2 213. In an embodiment of the present invention, all of the FLASH memory chips in a grouped or paired configuration may originate from the same manufacture and may be of the same type. Thus, for a grouped or paired FLASH memory configuration, memory library or flash library 217 may initially only need to support a single type of FLASH memory chip, (i.e., for a single type/manufacturer/make/model of FLASH memory chip).

In an embodiment according to the present invention, over the period of a few years during the life-span of an individual electronic device, the original memory devices, for example FLASH memory chips for the electronic device may be changed due to inventory constraints or other supply-chain issues. Thus, the make/manufacturer/model/type etc., of FLASH memory chips, for example FLASH 1 211 and FLASH 2 213, may be changed from, for example, INTEL™ to AMD™ FLASH memory chips. To support FLASH memory chip changes in the electronic device over the course of time, the memory library or flash library 217 may have incorporated therein drivers or FLASH-related functions/operations for all possible alternative FLASH memory chips, i.e., drivers for memory devices, for example FLASH memory chips from different FLASH memory chip manufacturers, models, types, etc. Thus, despite changing the original FLASH memory chips employed in the electronic device, the non-volatile memory 207 may be adapted to retain and maintain compatibility, and therefore remain capable of supporting replacement FLASH memory chips with the original version of update agent 215, (i.e., without the necessity of changing the update agent).

In an embodiment according to the present invention, over the period of a few years during the life-span of an individual electronic device model, the original FLASH memory chips for the electronic device may be changed due to inventory constraints or other supply-chain issues. If the FLASH memory chips are changed, a newer version of the update agent may also be created by compiling the update agent with memory libraries or flash libraries and/or functions compatible with the replacement/new FLASH memory chips being deployed/employed in the electronic device. This new version of the update agent may also be embedded in appropriate electronic devices.

Figure 3:
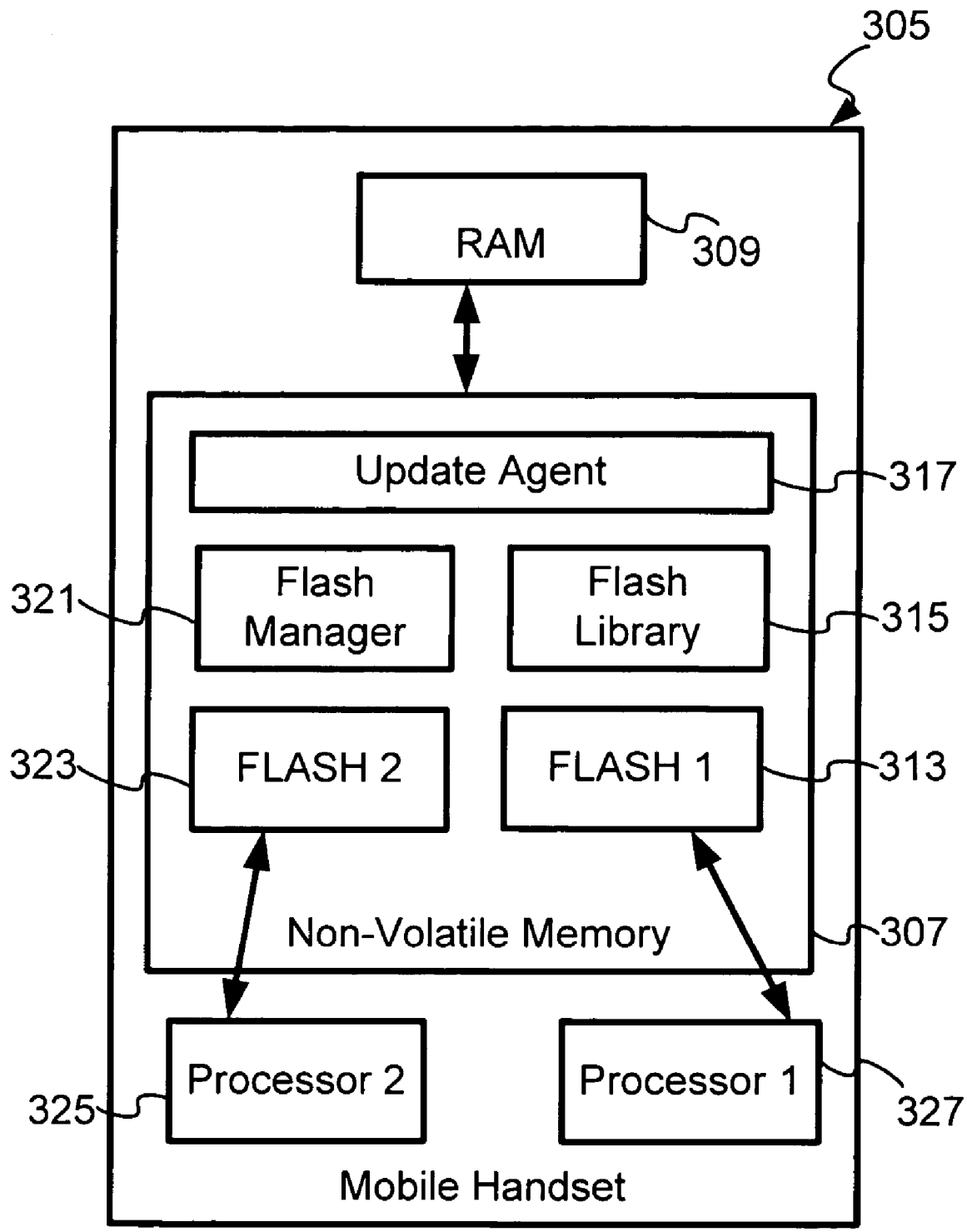
FIG. 3 is a block diagram illustrating another electronic device employing multiple FLASH memory chips in non-volatile memory according to an embodiment of the present invention.

FIG. 3 is a block diagram illustrating another electronic device employing multiple memory devices, for example FLASH memory chips in non-volatile memory according to an embodiment of the present invention. FIG. 3 illustrates an electronic device, for example mobile handset 305, that may employ multiple FLASH memory chips, for example FLASH 2 323 and FLASH 1 313, in non-volatile memory 307. The electronic device may also employ an update agent 317 resident in non-volatile memory 307 capable of updating code or data resident in any of the multiple FLASH memory chips, for example FLASH 2 323 and FLASH 1 313. The mobile handset 305 may comprise non-volatile memory 307, with multiple FLASH memory chips, for example FLASH 1 313 and FLASH 2 323, two processors, for example, PROCESSOR 1 327 and PROCESSOR 2 325, and RAM 309. For convenience and clarity, only two processors and two FLASH memory chips have been illustrated in FIG. 3, however numerous processors and memory devices, for example FLASH memory chips may be grouped in accordance with the present invention.

In an embodiment according to the present invention, PROCESSOR 1 327 may manage access to FLASH 1 313, while PROCESSOR 2 325 may manage access to FLASH 2 323. Update agent 317 may be resident in one of the FLASH memory chips, for example FLASH 1 313 and FLASH 2 323, or alternatively may be shared by the FLASH memory chips. Update agent 317 may also be executed by any of processors, for example PROCESSOR 1 327 and PROCESSOR 2 325. The processors may also individually update the contents of the memory devices, for example FLASH memory chips they manage. For example, the PROCESSOR 1 327 may update the contents, such as code, resident in FLASH 1 313 using update agent 317 and applying an update package comprising update information that may be resident in the same or another FLASH memory chip, for example either FLASH 2 323 or FLASH 1 313. Update agent 317 may also employ an appropriate memory driver or flash driver from the memory library or flash library 315 to access and manipulate contents resident in the memory devices, for example FLASH memory chips, for example FLASH 1 313 and FLASH 2 323.

In an embodiment according to the present invention, all of the processors, for example PROCESSOR 1 327 and PROCESSOR 2 325, may share non-volatile memory 307. When one of the processors, for example PROCESSOR 1 327, executes update agent 317, another processor may be suspended for the duration of the update process. The processor that executes the update agent may also be capable of updating code or data resident in any other FLASH memory chip, for example FLASH 1 313 and FLASH 2 323.

In an embodiment of the present invention, memory manager or flash manager 321 may be used to access a memory library or flash library 315 maintained over the memory devices, for example FLASH 1 313 and FLASH 2 323. Update agent 317 may be capable of invoking functions provided by memory manager or flash manager 321 to read, write, and otherwise manipulate the contents, such as code, resident in the FLASH memory chips, for example FLASH 1 313 and FLASH 2 323.

Figure 4:
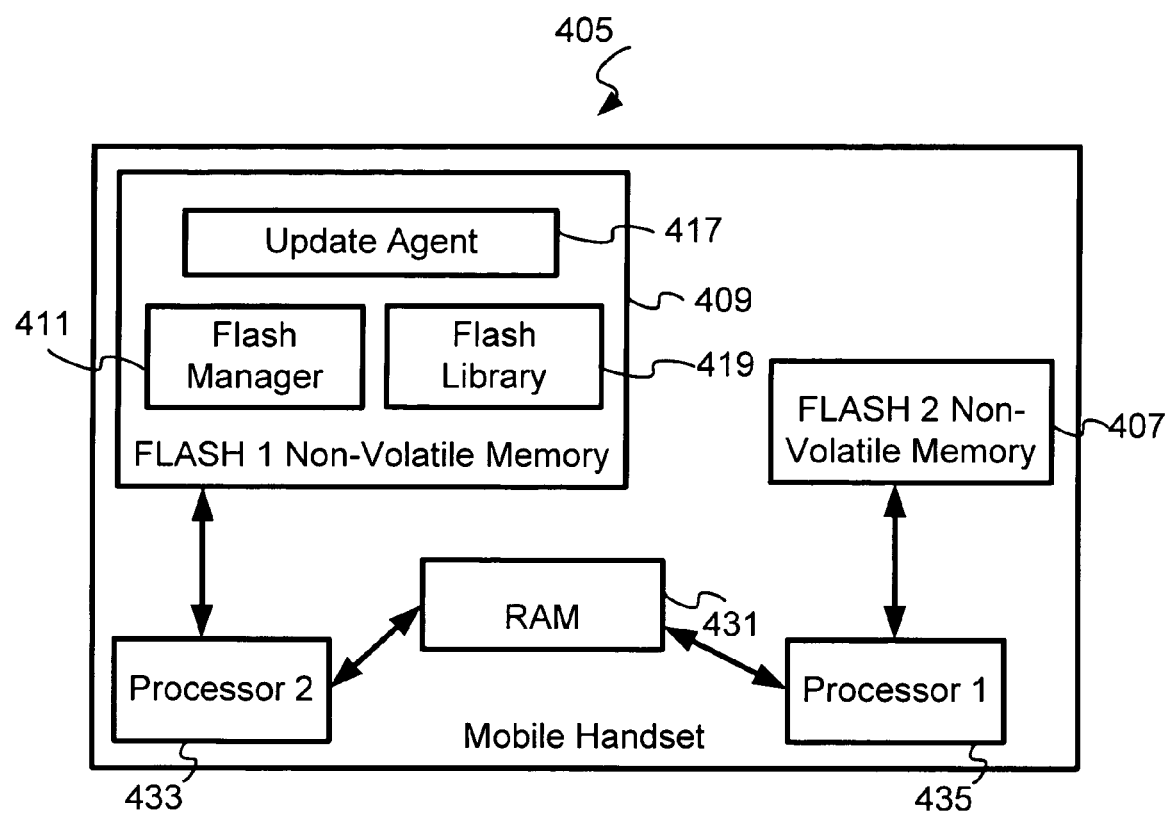
FIG. 4 is a block diagram illustrating an electronic device employing multiple processors according to an embodiment of the present invention.

FIG. 4 is a block diagram illustrating an electronic device employing multiple processors according to an embodiment of the present invention. FIG. 4 illustrates an electronic device, for example mobile handset 405, adapted to employ multiple processors, for example PROCESSOR 1 435 and PROCESSOR 2 433. For convenience and clarity, only two processors and two memory devices, for example FLASH memory chips have been illustrated in FIG. 4, however numerous processors and memory devices may be grouped in accordance with the present invention.

Each of the processors may manage a respective FLASH memory chip containing at least an update agent, memory manager or flash manager, and a memory library or flash library, for example update agent 417, memory manager or flash manager 411, and memory library or flash library 419 in a non-volatile FLASH 1 memory 409. PROCESSOR 1 435 may manage a similar FLASH memory chip, for example non-volatile FLASH 2 memory 407, while PROCESSOR 2 may manage non-volatile FLASH 1 memory chip 409, for example. The processors may share random access memory, for example RAM 431, to execute code by update agent 417.

An update package generator (not shown in FIG. 4) may generate update packages containing update information or addresses where update information may be accessed, but may not be cognizant of the number of processors being employed in the electronic device. The update package generator may also know the memory map of the memory devices, for example FLASH memory chips and RAM, and the specifications/information about the FLASH memory chips and RAM, for example the size of the FLASH memory chips and RAM. The update package generator may also know the memory map of the code segments and the data segments. Update packages may be created for the code segments of FLASH memory chips.

In an embodiment of the present invention, PROCESSOR 1 435, for example, may manage the contents of FLASH 2 407 and also provide access to code and data stored therein. Similarly, PROCESSOR 2 433, for example, may manage the contents of FLASH 1 409 and also provide access to code and data stored therein. Additionally, the memory map of the non-volatile memory in the electronic device, for example, mobile handset 405, may assign FLASH memory chips, for example FLASH 2 407 and FLASH 1 409 unique address spaces, i.e. the FLASH memory chips, may be independent of each other. Further, update agent 417 may be capable of updating the contents of FLASH 1 409, when invoked, by accessing an update package stored in FLASH 1 409 and an update agent resident in the FLASH 2 407 may also be capable of updating the contents of FLASH 2 407, when invoked, by accessing an update package stored in FLASH 2 407.

In an embodiment of the present invention, when the electronic device powers up, the electronic device may load some of the code resident in FLASH 1 409 into FLASH 2 407. Thus, in order to update the code resident in FLASH 2 407, specific segments or non-volatile memory banks of code in FLASH 1 409 that may be copied into FLASH 2 407 during startup may also need to be updated by update agent 417. Update agent 417 may also be used to update code and or data resident in FLASH 1 409 which may not be related to code copied to FLASH 2 407 during startup. The update agent 417 may also effectively be used to update code resident in FLASH 1 409 that will eventually be copied to FLASH 2 407 and employing update packages aimed at code that may be executable in PROCESSOR 1 435, for example.

In an embodiment according to the present invention, PROCESSOR 1 435 may be a digital signal processor (DSP) executing DSP code retrieved from a FLASH memory chip, for example FLASH 2 407 and which may also be copied into FLASH 2 407, for example, from FLASH 1 409 during startup. In order to update the code executed by a DSP processor, for example PROCESSOR 1 435 (that is retrieved from FLASH 2 407), the update agent 417, executed by PROCESSOR 2 433, for example, during power up or reboot, may update specific banks of non-volatile memory in FLASH 1 409, for example, using an appropriate update package stored in FLASH 1 409. Thus, updated DSP code from FLASH 1 409 may copied to FLASH 2 407, for example during startup or reboot, enabling PROCESSOR 1 435 to execute updated DSP code.

In an embodiment of the present invention, the electronic device may employ for example an OMAP® processor platform manufactured by Texas Instruments, Inc. wherein PROCESSOR 1 435, for example, may be a DSP processor, while PROCESSOR 2 433, may employ for example an ARM® processor platform manufactured by ARM, Inc. Instead of FLASH 2 407, PROCESSOR 1 may employ a random access memory (RAM) chip, such as a 512K RAM chip. The DSP processor may use the RAM memory chip to execute and load DSP code, for example during system startup. DSP code may be loaded from and reside in FLASH 1 409 for loading into the RAM. Update agent 417 may also update the DSP code resident in FLASH 1 409.

In an embodiment according to the present invention, the update package generator may employ different compression and optimization techniques for update packages created for the DSP code being executed by the DSP processor and other code being executed by PROCESSOR 2 433. Update agent 417 may also employ appropriate decompression and optimization techniques based upon or determined by the update packages.

Figure 5A:
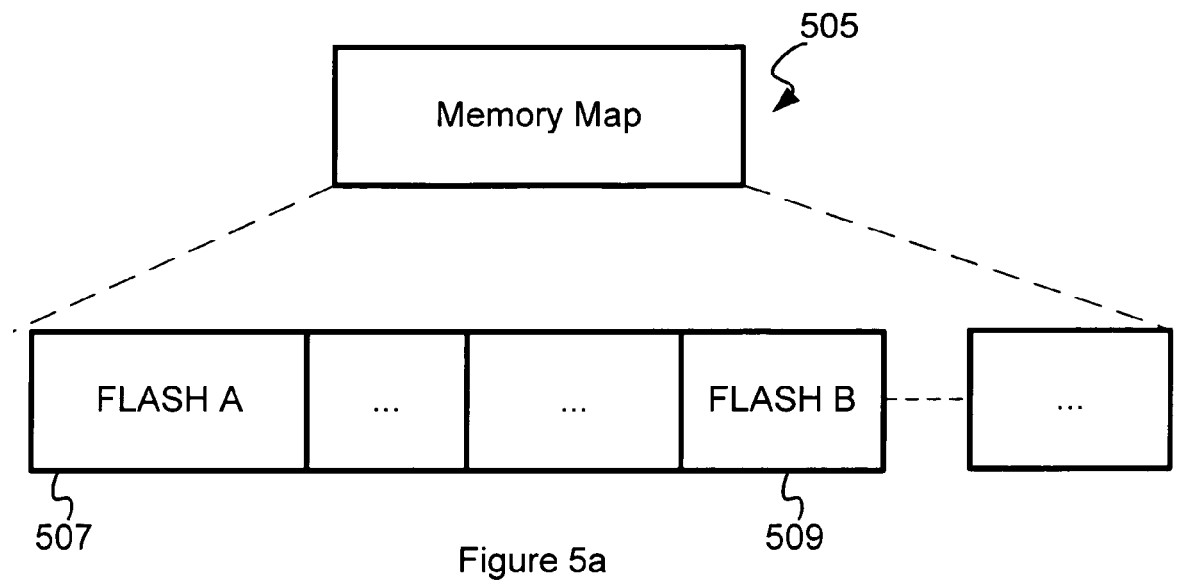
FIG. 5a is a block diagram illustrating an exemplary memory map for an electronic device according to an embodiment of the present invention.

FIG. 5*a* is a block diagram illustrating an exemplary memory map for an electronic device according to an embodiment of the present invention. FIG. 5*a* illustrates an exemplary memory map 505 for an electronic device having a plurality of memory devices, for example FLASH memory chips, such as FLASH A 507 and FLASH B 509, which may be employed in non-contiguous memory ranges. The update agent may update code and/or data resident in the plurality of FLASH memory chips, for example FLASH A 507 and FLASH B 509.

In an embodiment according to the present invention, FLASH B 509, for example, may be employed for a user data segment, and FLASH A, for example, may be employed for a code segment, including the update agent, firmware, etc. The update agent may be capable of retrieving an update package from FLASH B 509, for example, and employ the update package to update code in FLASH A 507, for example.

Figure 5B:
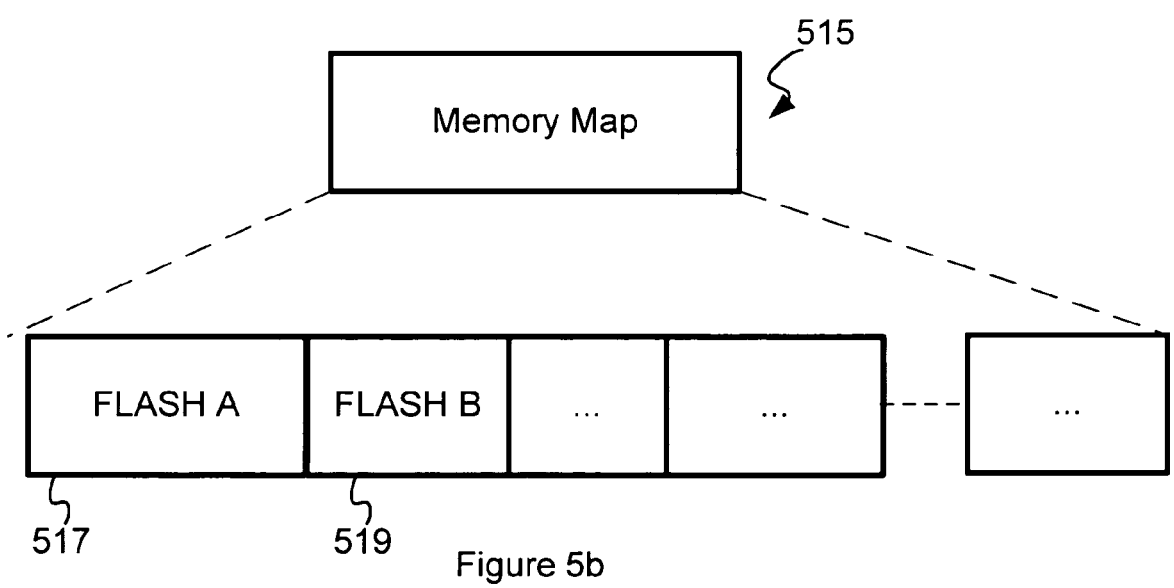
FIG. 5b is a block diagram illustrating another exemplary memory map for an electronic device according to an embodiment of the present invention.

FIG. 5*b* is a block diagram illustrating another exemplary memory map for an electronic device according to an embodiment of the present invention. FIG. 5*b* illustrates an exemplary memory map 515 for an electronic device having a plurality of memory devices, for example FLASH memory chips, such as FLASH A 517 and FLASH B 519, which may be employed in contiguous memory ranges such that the FLASH memory chips may be logically considered to be one contiguous block of non-volatile memory. The update agent may update code in the plurality of memory devices, for example FLASH memory chips, such as FLASH A 517 and FLASH B 519, using the same update package.

In an embodiment according to the present invention, the plurality of memory devices, for example FLASH memory chips, such as FLASH A 517 and FLASH B 519, may be made by different manufacturers and may also be of different sizes. The update agent may be capable of employing appropriate flash functions from a memory library or flash library to read, write, erase, or otherwise modify the contents of the plurality of FLASH memory chips, for example FLASH A 517 and FLASH B 519. The update agent may also determine which memory device, for example FLASH memory chip, is being manipulated and invoke an appropriate flash function to read, write, erase, or otherwise modify data from the associated memory device.

Figure 6:
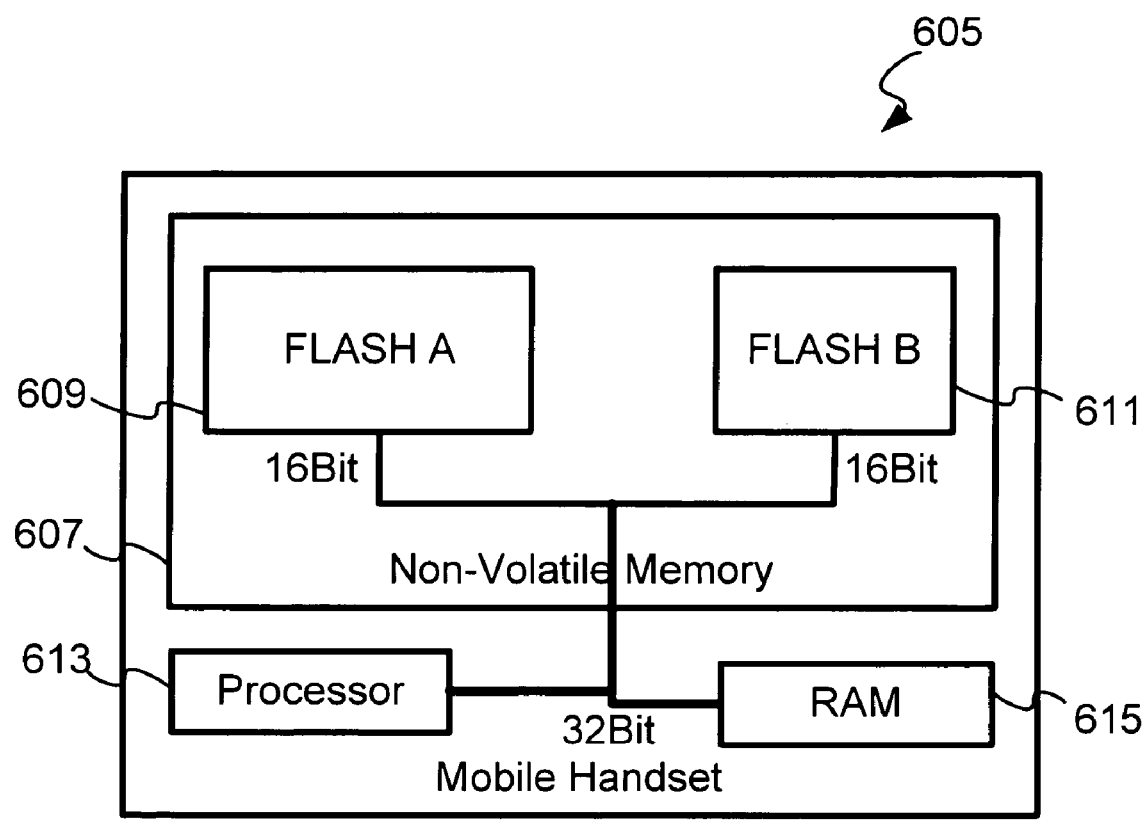
FIG. 6 is a block diagram illustrating an exemplary grouped FLASH architecture for a non-volatile memory of an electronic device according to an embodiment of the present invention.

FIG. 6 is a block diagram illustrating an exemplary grouped FLASH memory architecture for non-volatile memory 607 in an electronic device, for example mobile handset 605, according to an embodiment of the present invention. FIG. 6 illustrates an exemplary grouped memory architecture for non-volatile memory 607 in an electronic device, for example mobile handset 605, employing a plurality of memory devices, for example FLASH memory chips, such as FLASH A 609 and FLASH B 611. For convenience and clarity, only one processor and two memory devices, for example FLASH memory chips have been illustrated in FIG. 6, however numerous processors and memory devices may be grouped in accordance with the present invention. The electronic device, for example mobile handset 605 may at least comprise non-volatile memory 607, processor 613, and RAM 615. The mobile handset 605 is a representation of any of a number of electronic devices in which an embodiment of the invention may have application, including for example, personal computers, personal digital assistants, pagers, MP3 players, etc.

In an embodiment according to the present invention, a processor may employ a 32 bit data bus to send data to non-volatile memory 607 employing a plurality of memory devices, for example FLASH memory chips, such as FLASH A 609 and FLASH B 611, in a grouped architecture. Each FLASH memory chip may employ a 16 bit data bus to store a 16 bit subset of the 32-bit data provided by the data bus from the processor 613 or RAM 615. The update agent may update code stored in the grouped memory devices, for example FLASH memory chips, such as FLASH A 609 and FLASH B 611, employing an appropriate update package.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by this disclosure and the appended diagrams. It is intended that the scope of the invention be limited not with this detailed description, but rather by the claims appended hereto.

What is claimed is:

1. A method of updating non-volatile memory in an electronic device via a communication network, the non-volatile memory comprising a plurality of memory devices comprising a first memory device having a first associated access type and second memory device having a second associated access type, wherein the first associated access type and second associated access type are not the same, the method comprising:

receiving update information via the communication network;

selecting at least one of the plurality of memory devices to be updated using the update information;

identifying, from a group corresponding to memory devices to which access has been enabled, updating software corresponding to at least the associated access type of the at least one of the plurality of memory devices; and updating the at least one of the plurality of memory devices using the identified updating software and the update information;

wherein the non-volatile memory comprises software functions enabling access to and manipulation of the first memory device and the second memory device, first updating software corresponding to the first associated access type, and second updating software corresponding to the second associated access type.

2. The method according to claim 1, further comprising determining the associated access type of the at least one of the plurality of memory devices to be updated.

3. The method according to claim 1, wherein the communication network is a wireless network.

4. The method according to claim 1, wherein the communication network is a public network.

5. The method according to claim 1, further comprising verifying the updating of the one of the at least one memory device using one of a CRC (Cyclic Redundancy Check), a checksum, a hash code, and a digital signature.

6. A method of updating non-volatile memory in an electronic device via a communication network, the non-volatile memory comprising a plurality of memory devices comprising a first memory device having a first associated access type and a second memory device having a second associated access type, wherein the first associated access type and second associated access type are not the same, the method comprising:

communicating update information in an update package via the communication network from a management server to the electronic device; and employing an update agent to interact with a memory library and the plurality of memory devices in non-volatile memory in the electronic device, and to identify, from a group corresponding to memory devices to which access has been enabled, updating software corresponding to at least an associated access type of at least one of the plurality of memory devices;

wherein the non-volatile memory comprises software functions enabling access to and manipulation of the first memory device and the second memory device, first updating software corresponding to the first associated access type, and second updating software corresponding to the second associated access type.

7. The method according to claim 6, further comprising:

employing a memory manager to access contents stored in the plurality of memory devices, wherein the plurality of memory devices comprises a plurality of FLASH memory chips; and employing the memory library to modify contents of at least one FLASH memory chip.

8. The method according to claim 7, wherein the plurality of FLASH memory chips comprise FLASH memory chips fabricated by different manufacturers, and the plurality of FLASH memory chips comprise one of a same amount of memory size and a different amount of memory size.

9. The method according to claim 8, further comprising:

determining which of the plurality of FLASH memory chips correspond to a particular FLASH memory modification;

employing an appropriate FLASH memory chip function; and performing a corresponding FLASH memory modification.

10. The method according to claim 8, further comprising employing the memory library by the update agent to permit access to and manipulation of a plurality of FLASH memory chips fabricated by different manufacturers, and invoking appropriate functions stored in the memory library corresponding to the different manufacturers FLASH memory chips.

11. The method according to claim 6, further comprising storing generic functions in the memory library which are employable by the update agent; and modifying contents of the at least one of the plurality of memory devices without identifying actual details regarding a specific memory device, wherein the actual details may be selected from a group comprising memory device manufacturer, memory device type, memory size, memory model, and memory brand.

12. The method according to claim 6, wherein the plurality of memory devices are adapted to be grouped together, paired together, or arranged serially in non volatile memory in the electronic device.

13. The method according to claim 6, further comprising creating a memory map of memory device architecture, the memory map containing information selected from a group comprising of a number of memory devices being employed by the electronic device, address ranges assigned to the memory devices, memory device operating mode, a map of data segments resident in the memory devices, and a map of code segments resident in the memory devices.

14. The method according to claim 6, wherein the electronic device comprises one of a mobile cellular phone handset, a personal digital assistant, a pager, an MP3 (Moving Pictures Experts Group Phase 1 Audio Layer 3) player, and a digital camera.

15. The method according to claim 6, further comprising employing an update package status and reference section by the update agent code to retrieve information regarding functions stored in a memory library code.

16. The method according to claim 15, wherein the update package status and reference section further comprises at least one of a status flag, starting address, authentication value, location of update package, and locations of a plurality of modification functions in non-volatile memory of the electronic device.

17. The method according to claim 6, wherein the update package comprises update information for at least one of firmware and software, version upgrades, instructions to add new services, and instructions to delete services employable in the electronic device.

18. The method according to claim 6, further comprising employing a boot initialization code to determine whether an update agent code is executed.

19. The method according to claim 18, wherein determining whether the update agent code is executed comprises evaluating status information resident in an update package status and reference section, and wherein if it is determined that the update agent code is to be executed, then the update agent code accesses an update package resident in the non-volatile memory of the electronic device by employing an address of the update package stored in the update package status and reference section.

20. The method according to claim 6, wherein the update agent is adapted to interact with a plurality of the plurality of memory devices as a single logical block of non-volatile memory without distinguishing between specific memory devices.

21. The method according to claim 20, wherein the plurality of memory devices are arranged according to one of contiguously or non-contiguously in memory, and code and data resident in the memory devices are updateable by the update agent regardless of which memory device the code and data reside in.

22. The method according to claim 6, wherein the memory library is adapted to accommodate a plurality of different types of memory devices by being provided with drivers for the plurality of different types of memory devices during manufacture.

23. The method according to claim 6, wherein the update agent is adapted to accommodate a plurality of different types of memory devices by accessing the memory library and compiling the update agent anew with drivers for the plurality of different types of memory devices stored in the memory library during manufacture.

24. The method according to claim 6, wherein the electronic device comprises one or more processors, and wherein the one or more processors may be associated with a specific memory device.

25. The method according to claim 6, wherein the electronic device comprises a plurality of processors and each of the processors is associated with a specific memory device.

26. The method according to claim 6, wherein the electronic device comprises a plurality of processors and the plurality of processors are adapted to share the plurality of memory devices.

27. The method according to claim 6, wherein the electronic device comprises a digital signal processor (DSP) adapted to execute DSP code retrieved from at least one memory device.

28. A mobile services network adapted to update at least one electronic device, the network comprising:

a management server communicatively connectable to the at least one electronic device via a communication link, the management server adapted to transmit update information in an update package to the electronic device, and the electronic device comprising a plurality of memory devices comprising a first memory device having a first associated access type and a second memory device having a second associated access type, wherein the first associated access type and second associated access type are not the same, and an update agent employing a memory library to interact with the plurality of memory devices in non-volatile memory in the electronic device and to identify, from a group corresponding to memory devices to which access has been enabled, updating software corresponding to at least an associated access type of at least one of the plurality of memory devices.

29. The network according to claim 28, further comprising:

a memory manager adapted to be employed by the update agent to access contents stored in the plurality of memory devices; and a memory library adapted to support modifications of content in the plurality of memory devices.

30. The network according to claim 28, wherein the plurality of memory devices comprise memory devices fabricated by different manufacturers, and the plurality of memory devices comprise one of a same amount of memory size and a different amount of memory size.

31. The network according to claim 30, wherein the update agent is adapted to determine which of the plurality of memory devices correspond to a particular memory modification, and employ an appropriate memory device function available in the memory library to perform a corresponding memory modification.

32. The network according to claim 28, wherein the memory library is employable by the update agent to permit access to and manipulation of a plurality of memory devices fabricated by different manufacturers by invoking appropriate functions stored in the memory library which correspond to the different manufacturers memory devices.

33. The network according to claim 28, wherein the memory library may store generic functions employable by the update agent to modify contents of the plurality of memory devices without identifying actual details regarding a specific memory device, the actual details may be selected from a group comprising memory manufacturer, memory type, memory size, memory model, and memory brand.

34. The network according to claim 28, wherein the plurality of memory devices are adapted to be grouped together, paired together, or arranged serially.

35. The network according to claim 28, further comprising a memory map of memory device architecture, the memory map being adapted to contain information selected from a group comprising a number of memory devices being employed by the electronic device, address ranges assigned to the memory devices, memory device operating mode, a map of data segments resident in the memory devices, and a map of code segments resident in the memory devices.

36. The network according to claim 28, wherein the electronic device comprises one of a mobile cellular phone handset, a personal digital assistant, a pager, an MP3 (Moving Pictures Experts Group Phase 1 Audio Layer 3) player, and a digital camera.

37. The network according to claim 28, wherein the non-volatile memory further comprises an update package status and reference section employable by an update agent code to retrieve information regarding functions stored in a memory library code.

38. The network according to claim 28, wherein the update package comprises update information for at least one of firmware and software, version upgrades, instructions to add new services, and instructions to delete services employable in the electronic device.

39. The network according to claim 28, wherein the electronic device is adapted to employ a boot initialization code to determine whether an update agent code is executed, and determining whether the update agent code is executed comprises evaluation of status information resident in an update package status and reference section, wherein if it is determined that the update agent code is to be executed, then update agent code accesses an update package resident in the non-volatile memory by employing an address of the update package stored in the update package status and reference section.

40. The network according to claim 39, wherein the update package status and reference section further comprises at least one of a status flag, starting address, authentication value, location of update package, and locations of a plurality of modification functions in non-volatile memory of the electronic device.

41. The network according to claim 28, wherein the update agent is adapted to interact with a plurality of the plurality of memory devices as a single logical block of non-volatile memory without distinguishing between specific memory devices.

42. The network according to claim 41, wherein the plurality of memory devices may be arranged as one of contiguously or non-contiguously in memory, and code and data resident in the memory devices are updateable by the update agent regardless of which memory device the code and data reside in.

43. The network according to claim 28, wherein the memory library is adapted to accommodate a plurality of different types of memory devices by being provided with drivers for the plurality of different types of memory devices during manufacture.

44. The network according to claim 28, wherein the update agent is adapted to accommodate a plurality of different types of memory devices by accessing the memory library and compiling the update agent with drivers for the plurality of different types of memory devices stored in the memory library during manufacture.

45. The network according to claim 28, wherein the electronic device comprises one or more processors, and wherein the one or more processors may be associated with a specific memory device.

46. The network according to claim 28, wherein the electronic device comprises a plurality of processors and each of the processors is associated with a specific memory device.

47. The network according to claim 28, wherein the electronic device comprises a plurality of processors and the plurality of processors are adapted to share the plurality of memory devices.

48. The network according to claim 28, wherein the electronic device comprises a digital signal processor (DSP) adapted to execute DSP code retrieved from at least one memory device.

49. A mobile handset comprising:
a plurality of flash memory chips comprising a first flash memory chip having a first associated access type and a second flash memory chip having a second associated access type, wherein the first associated access type and second associated access type are not the same; and
an update agent capable of identifying, from a group corresponding to memory devices to which access has been enabled, updating software corresponding to at least an associated access type of the at least one of the plurality of memory devices, and updating at least one of firmware and software resident in at least one of the plurality of flash memory chips using the identified updating software.

50. The mobile handset according to claim 49, wherein the update agent is adapted to determine information regarding a type of each of the plurality of flash memory chips at runtime, the mobile handset further comprises a plurality of flash drivers, wherein the mobile handset is adapted to employ an appropriate one of the plurality of flash drivers to update at least a portion of at least one of firmware and software resident in at least one of the plurality of flash memory chips.

51. The mobile handset according to claim 50, further comprising a plurality of processors, wherein each of the processors is adapted to manipulating a specific subset of the plurality of flash memory chips, and the plurality of processors are also adapted to employ the update agent to update at least one of firmware and software resident in at least one specific subset of flash memory chips.

52. The mobile handset according to claim 49, further comprising:
a first processor adapted to update at least one of firmware and software resident in at least one of the plurality of flash memory chips;
a second processor adapted to execute code resident in at least one of the plurality of flash memory chips, wherein the first processor is adapted to execute the update agent to update at least one of firmware and software resident in at least one of the plurality of flash memory chips, and the second processor is adapted to execute an update version of code resident in at least one of the plurality of flash memory chips.

* * * * *